(No Model.)

2 Sheets—Sheet 1.

H. KELLER.
CORN PLANTER.

No. 542,261.  Patented July 9, 1895.

WITNESSES:
Walter F. Burns
Henry C. Kramer

Henry Keller  INVENTOR

BY Chapin & Denny
his ATTORNEYS.

(No Model.) 2 Sheets—Sheet 2.
H. KELLER.
CORN PLANTER.
No. 542,261. Patented July 9, 1895.
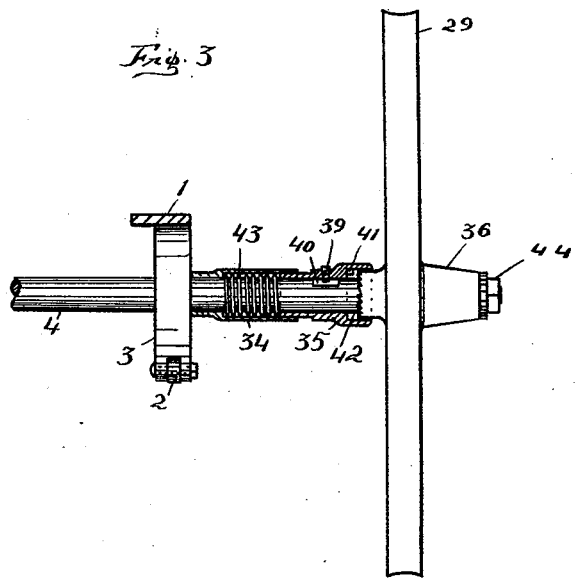
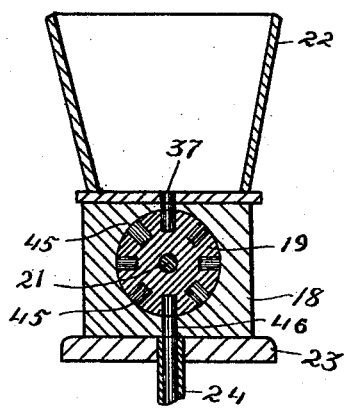
WITNESSES: Henry Keller INVENTOR
Walter G Burns
Henry C. Kramer BY Chapin & Denny
his ATTORNEYS.

UNITED STATES PATENT OFFICE.

HENRY KELLER, OF WOODBURN, INDIANA.

CORN-PLANTER.

SPECIFICATION forming part of Letters Patent No. 542,261, dated July 9, 1895.

Application filed February 21, 1895. Serial No. 539,205. (No model.)

*To all whom it may concern:*

Be it known that I, HENRY KELLER, a citizen of the United States, residing at Woodburn, in the county of Allen, in the State of Indiana, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form part of this specification.

In an application filed November 19, 1894, Serial No. 529,344, I have described and specifically claimed certain features, parts, and combination of features in corn-planters, and I do not therefore herein claim the features and combinations so expressly and specifically.

My invention relates to improvements in corn-planters.

The objects of my invention are, first, to provide an improved wheeled corn-planter of simple and economical construction adapted to simultaneously plant two rows of corn, to open furrows for the reception of the corn and subsequently cover the same, to drop the corn with measured regularity, so arranged as to be readily thrown into and out of operative position for moving the planter from one field to another or when turning at the end of the row, having a two-part planter-frame with a pivotal connection, and is so constructed that the weight of the driver will approximately balance the weight of the operating mechanism and so arranged that the planting-shoes will readily pass over a root or other obstruction without derangement of or interference with the operating mechanism; second, to provide an improved seed-dropping mechanism and improved means for actuating the same.

My invention comprises a two-part pivotally-connected frame mounted upon a rotary driving shaft or axle carried by proper supporting-wheels, an actuating-cam adapted to operate the seed-dropping mechanism by means of a bell-crank lever, a transverse ratchet-shaft, and connecting mechanism.

The novel features of my invention are the construction and arrangement of the seed-dropping mechanism and the improved means for actuating the same from the driving-axle, and other details hereinafter described.

Similar figures of reference indicate corresponding parts throughout the several views.

Figure 1:
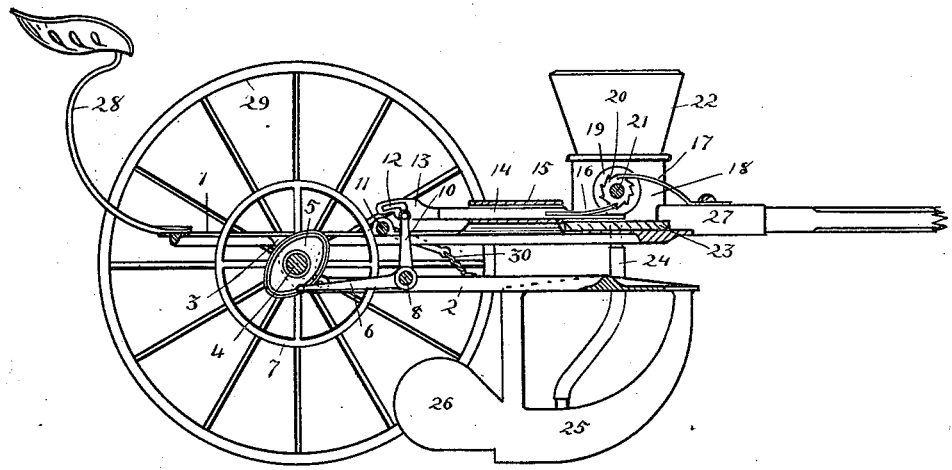
Figure 2:
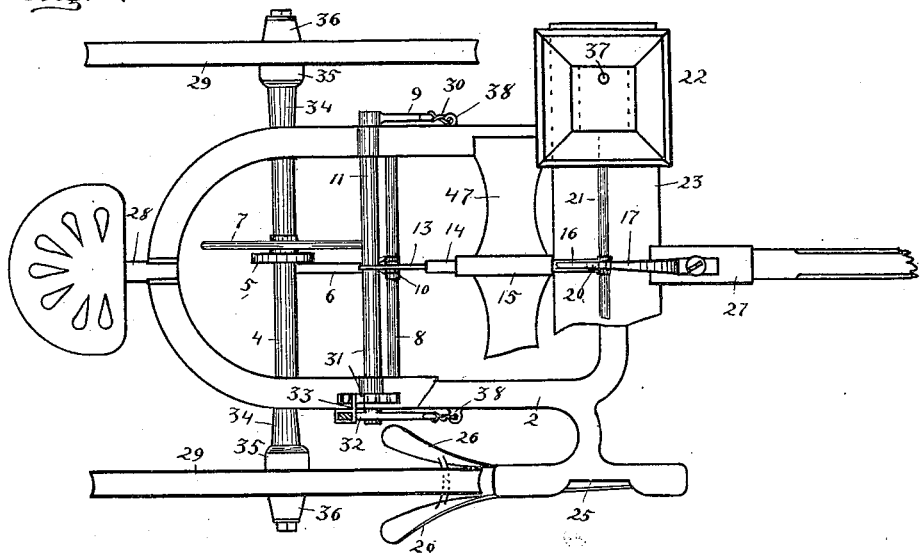

Referring now to the drawings, Figure 1 is a longitudinal central section of my improved planter, showing the relative arrangement of the seed-dropping mechanism, the means for actuating the same, and of the pivotally-connected two-part frame. Fig. 2 is a plan of the same with a portion of the upper frame cut away to show the lower shoe-supporting frame. Fig. 3 is a rear view of the spring actuating-collar, by which the driving-axle is made to rotate with the ground-wheels, and also of the depending lugs on the main frame, to which the planting-shoe frame is connected. Fig. 4 is a vertical section of the rotatable feeding-cylinder in its containing-box and of the surmounted hopper, showing the novel connection of the hopper with the seed-discharging tube.

The main frame I, preferably of metal, cast in one piece, and semi-elliptical in form, as seen in Fig. 2, is supported at or near its rear end by the rotary driving-axle 4, which passes through the depending integral lugs 3, Figs. 1 and 3, and is supported by the tongue, properly mounted and secured in the metallic boxing 27.

Upon the forward end of the main frame 1 is rigidly fixed the transverse hopper-plate 23, preferably of wood, carrying upon its extended ends the feeding-cylinder boxes and the surmounted hoppers, and immediately adjacent thereto is fixed a cross-plate 47 to support the sliding bar actuating the feeding-cylinders. The said main frame also carries at its rear end a detachable seat 28, of any proper construction, so arranged that the weight of the operator thereon will to some extent balance the weight of the operating mechanism upon the front end of the main frame, and is provided near its central portion with rotatably-mounted rock-shaft 11, carrying upon its extended ends the integral forwardly-extended oblique arms 9, connected to the frame 2 by the chains 30 for elevating the planting-shoes and also provided upon one extremity thereof with a rigid upright hand-lever 32 for operating the said rock-shaft 11. The said frame 1 is also provided with the notched sector-stand 31, adapted to engage a proper spring-latch 33 on the said hand-lever 32.

The lower parallel shoe-supporting frame 2, preferably of metal, is ⋂-shaped, with its rear ends pivotally mounted in the said depending lugs 3, Figs. 1 and 3, has its forward end supported by the planting-shoes 25, and is provided with a transverse rock-shaft 8, loosely mounted in suitable perforated lugs on the said frame. At a point in said shaft midway its length is rigidly fixed a bell-crank lever, whose horizontal rearwardly-extended arm 6 is adapted to engage the actuating-cam 5, hereinafter described, and whose vertical arm 10 forms a loose engagement with the rear end of the vibrating lever 14, Fig. 1.

The rotary driving-axle 4 is mounted on proper supporting-wheels 29, having at or near its lengthwise central portion the rigid hand-wheel 7 and immediately adjacent thereto the rigid elliptical actuating-cam 5, having upon its face, opposite the said wheel, a lateral groove, into which a lateral lug on the free end of the said arm 6 is adapted to slide. Near the extremities of the said axle is loosely mounted the sleeve or collar 35, secured in position by the set-screw 39, extending into the longitudinal slot 40, Fig. 3, to permit a limited longitudinal play of the said sleeve when in use. The outer end of the sleeve 35 receives the inner face of the hub 36, having a series of holding-teeth 42, adapted to normally form a locked engagement with the holding-lug 41 on the outer end of the said sleeve, which is so arranged as to permit the wheel 29 to rotate freely upon said axle in a rearward direction, but will carry the axle with it when rotated in a forward direction. Upon the said axle, adjacent the inner end of the said sleeve 35, slightly overlapping the same, is arranged a second sleeve 34, loosely mounted, and having its inner end bearing against the outer face of the said lugs 3. Inclosed within said sleeve 34, upon the said axle, is arranged a coil-spring 43, its inner end bearing against a proper annular shoulder in said sleeve and its outer end adapted to bear against the inner end of the said sleeve 35 to press it into engagement with the inner face of the said hub. The said transverse metallic plate 47 is provided with a box 15 at or near its central portion, in which is loosely mounted the vibrating lever 14, having upon its rear end the extended lug 13, provided with a rectangular slot 12, in which a suitable lateral lug or pin in the upper end of the crank-arm 10 is loosely mounted. The forward end of the said lever 14 has a longitudinally arranged pawl or spring 16, the forward end of which is adapted to engage the teeth of the ratchet-wheel 20.

The boxes 18, rigidly fixed upon the extremities of the cross-plate 23, have a vertical opening in the upper portion into the seed-hopper 22 and a like vertical opening in the bottom thereof into the seed-tubes 24, and are provided with a cylindrical opening, into which the seed-feeding cylinders 19 are snugly fitted but rotatively mounted. The said cylinders are rigidly fixed upon the ends of the shaft 21 and are provided with a series of seed-holding receptacles 45, adapted to register alternately with the said opening 37 to the hopper and with the said opening 46 into the seed-discharging tubes. The said shaft 21 at a point midway its length is provided with a rigid ratchet-wheel 20 to engage the said actuating pawl or spring 16 upon the lower side thereof and also the holding pawl or spring 17, rigidly fixed upon the tongue-supporting box 27. The metallic shoes 25, either rigidly secured to the forward end of the said frame 2 or integral therewith, are arranged immediately before and in line with the wheel 29, have rearwardly-projecting lateral wings 26, and are provided with the flexible seed-discharging tubes 24. The hand-wheel 7 is adapted to set the seed-dropping mechanism in proper position at the beginning of a row in a well-understood manner.

The operation of my improved corn-planter thus described is obviously substantially as follows: The weight of the operator upon the seat 28 on the main frame 1 approximately balances the weight of the seed-dropping mechanism, and thereby relieves the team of its weight. The forward rotation of the supporting-wheels rotates the said driving-axle 4 by the engagement of the sleeves 35 with the ratchet-face of the hubs, thereby also rotating the rigid elliptical cam 5, which by its rotation raises and lowers the rear arm 6 of the bell-crank lever. When the planter is in its normal position, with the lower frame 2 substantially parallel with the main frame 1, the lateral lug on the upper end of the arm 10 will be engaged with the lower and vertical portion of the slot 12 of the said lug on the vibrating lever 14, and consequently actuating the said arm 6 by the said cam will impart a corresponding vibratory movement to the sliding bar 14, thereby actuating the said shaft 21, with its surmounted feeding-cylinders, by the engagement of the said pawl or spring 16 with the ratchet-wheel 20. By the alternate registering of the said seed-receptacle in the said cylinders with the said openings 37 and 46 the seed will be properly discharged through the tubes 24 into the furrows made by the planting-shoes and will be covered by the ground-wheels. Simply raising the said shoes from the ground by means of the said hand-lever will evidently throw the seeding mechanism out of gear by forcing the engaging-pin in the upper end of the arm 10 into the horizontal portion of the said slot 12. It is thus seen that by throwing the lifting-lever 32 rearwardly and securing the same by means of the latch 33, engaging the ratchet-stand 31, the planting-shoes will be lifted clear of the ground, the arm 10 of the bell-crank lever being then engaged with the rear and horizontal part of the said slot 12 and held in that position, which is desirable in practice when moving the planter from one field to another or when turning at the end of the row.

It is obvious that my improvement is thus adapted to open simultaneously two corn-rows, subsequently depositing the seed in, and finally covering and rolling said furrow by the following ground-wheels, and, also, that my machine is simple in both its construction and operation, with all the necessary operative parts within reach and convenient manipulation of the driver.

Having thus described my invention and the manner in which the same is to be applied, what I desire to secure by Letters Patent is—

1. In a corn planter, the combination of a rotary driving-axle mounted in proper ground wheels having ratchet face hubs and the described means for forming a locked engagement of the said axle with said wheels, and provided with a fixed cam 5 adapted to actuate the seed dropping mechanism, a main-frame 1 carrying the operating mechanism, a planting-shoe frame 2 pivotally connected to the frame 2 as shown, the feeding cylinders 19 mounted as shown upon the ends of the transverse shaft 21 and having a series of seed receptacles 45 adapted to alternately register with the openings from the hopper and those to the discharging tubes, the rotatable shaft 21 having a ratchet wheel midway its ends, the vibrating lever 14 adapted to actuate the said shaft 21 by engaging the said ratchet wheel and having at its rear end a rectangular lug 12 and the bell-crank lever rigidly fixed on the rock-shaft 8, the horizontal arm 6 of which is mounted as described in the said cam 5 and having its vertical arm 10 engaged with the vibrating lever 14 in the said slot 12, whereby elevating the planting shoes automatically throws the seeding mechanism out of gear, all substantially as described.

2. In a corn planter, the seed dropping mechanism comprising the following instrumentalities: the transverse shaft 21 rotatably mounted as shown in the boxes 18, carrying on its extremities the feeding cylinders 19 provided with registering seed-receptacles, as described, and having at the center of its length the rigid ratchet wheel 20 to engage the vibrating lever, the lever 14 having upon its forward end means for actuating the said wheel and provided at its rear end with a slotted extension as shown, for the purpose of throwing the said mechanism out of gear by elevating the planting-shoes, and a bell-crank lever rigidly fixed on the rock shaft 8 having its upper end loosely mounted in the said slotted end of the vibrating lever and adapted to operate the same, and having its lower arm mounted as described in the actuating cam 5 rigidly fixed upon the driving axle, all substantially as and for the purpose set forth and described.

Signed by me, at Fort Wayne, Allen county, State of Indiana, this 9th day of February, 1895.

HENRY KELLER.

Witnesses:
  WALTER G. BURNS,
  LOUIS H. GOCKE.